United States Patent Office 3,666,432
Patented May 30, 1972

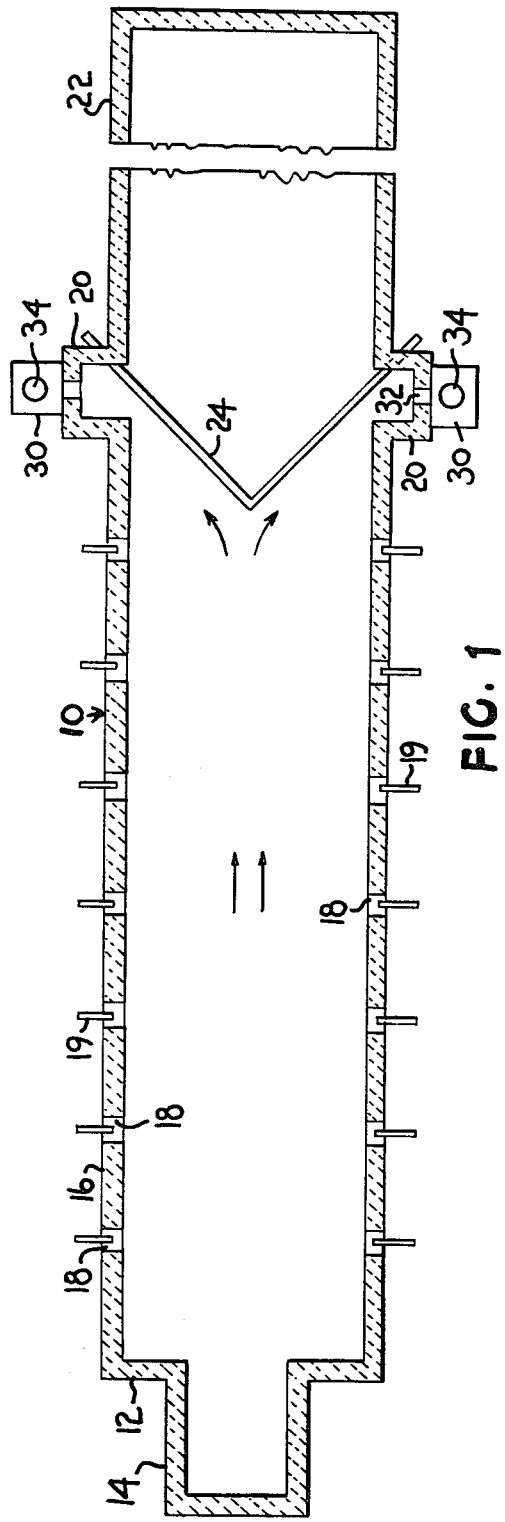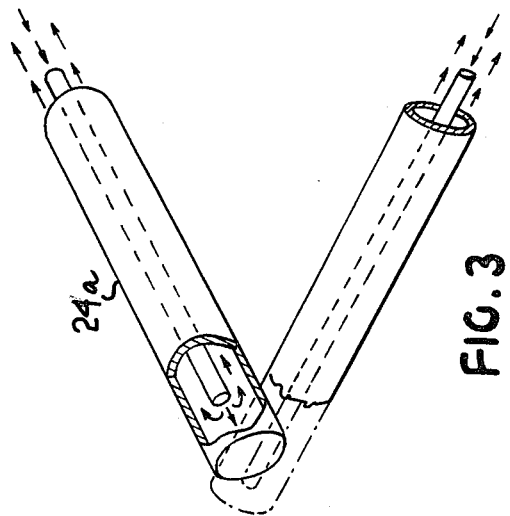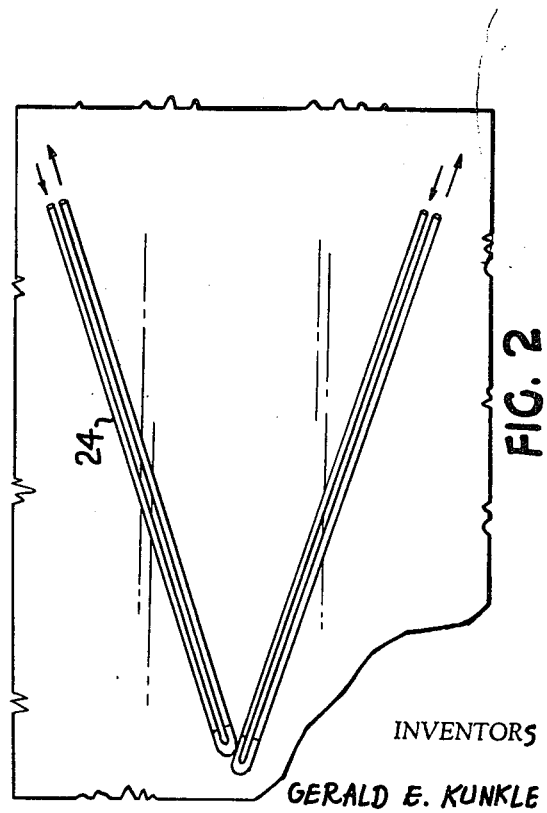

3,666,432
PROCESS AND APPARATUS FOR SEPARATING FOAM FROM A MOLTEN BODY OF GLASS
Gerald E. Kunkle, New Kensington, Pa., and William E. Heidish, Huntsville, Ala., assignors to PPG Industries, Inc., Pittsburgh, Pa.
Continuation-in-part of application Ser. No. 758,726, Sept. 10, 1968. This application Mar. 11, 1971, Ser. No. 123,297
Int. Cl. C03b 5/20
U.S. Cl. 65—27
8 Claims

ABSTRACT OF THE DISCLOSURE

In melting high-temperature glass with volatile components such boron trioxide, there is used a furnace with a skimmer that comprises a water-cooled pipe in contact with the glass, the furnace also having means to withdraw the material retained behind the skimmer. The water-cooled pipe is positioned at an angle with respect to the side walls of the furnace; preferably two such pipes are used, such to form a V with its apex uptank, within the firing zone of the furnace. The invention provides an unobvious solution to a problem concerning the production of a sodium-boron glass for aircraft use.

CROSS-REFERENCE TO RELATED APPLICATIONS

This application is a continuation-in-part of our copending application Ser. No. 758,726, filed Sept. 10, 1968, now abandoned.

BACKGROUND OF THE INVENTION

(1) Field of the invention

This invention relates to the making of flat glass, and in particular to the production of high-temperature glass. In one aspect, it relates to a method for the production of a high-temperature glass that has a volatile component, and in other aspects, it concerns a method and apparatus for melting glass.

(2) Background of the invention

Particular problems attend the melting of a glass that vitrifies at above about 2500 degrees Fahrenheit and contains one or more volatile components. One such glass is known as "No. 1578." Its nominal composition is as follows: 20 percent alumina, 8 percent alumina, 8 percent sodium oxide, 5 percent lithium oxide, 4 percent boron trioxide, balance substantially silica. When ground and polished by twin grinding, it is used for windows in ships or aircraft. In the above composition, the boron oxide component is volatile. When an attempt is made to melt the above composition in a conventional glass-melting furnace of the kind in which glass batch is fed to one end of a furnace generally rectangular in plan outline with the glass passing to the opposite end thereof and being withdrawn for the rolling thereof, there is encountered (unless measures are taken) the problem that a siliceous scum, initially thought to be unmelted sand, develops on the surface of the melt. The scum appears also on the surfaces of the as-rolled ribbon, and, after the furnace has operated for about a few hours, the siliceous layer is too thick to be removed from the as-rolled glass by a single pass through a twin-grinding line. The scum tends to accumulate behind a skimmer or floater placed in the furnace near the exit canal, and it has the effect of insulating the melt from the action of the burners that ought to be used to heat it. This retards or prevents the development in the furnace of the usual convection currents that are relied upon for the homogenization of the glass. In short, the melting of such a glass is nearly impractical unless measures of some sort are taken to overcome the problem indicated above, and as has been indicated, even the true nature of the problem was not initially apparent to those skilled in the art. Indeed, when the problem arose in industry, the remedy initially tried was the use of more heat in an effort to melt "unmelted sand," and this in fact worsened the problem of volatilization of the fugitive components of the glass in the strata near the surface of the melt.

The prior art with respect to glass melting shows floaters or skimmers that are of V shape, with the apex uptank, to direct surface scum and the like to the edges of the tank and hopefully to the edges of the issuing ribbon of glass. Such pieces have usually been made of refractory materials. The patents also contain reference to the use of water-cooled pipes in contact with the glass being melted, and indeed, to the use of such pipes as skimmers, but those skilled in the art were by no means led by such patent references to the use of such an expedient for the solution to the problem discussed above. Particularly in view of the high-melting nature of the glass being produced, it was considered likely that the pipes would melt unless made of prohibitively expensive material, and there was also to be considered the danger that such pipes might provide too large a heat sink (thereby causing the furnace to freeze up) and the danger that such pipes might be generative of seeds or blisters or other defects in the product glasses, again in view of the high-melting nature of the glass.

SUMMARY OF THE INVENTION

According to the invention, a cooled member, such as a metal pipe through which there is passed a cooling fluid, as for example, water, is placed transversely of the tank. Preferably the skimmer, as such a metal pipe is hereinafter called, is generally V-shaped (or in constructed in parts which are assembled to form a V) such that the terminal ends are positioned in and passed through the walls of the skim kilns of the tank while the apex is positioned toward the feeding end of the tank or uptank of the skim kilns. Also, while a skimmer can be partially immersed in the glass, preferably it should be placed for glass contact only, and because of its being cooled, a layer of glass freezes around at least a portion thereof. Thus, there is no contamination of the glass flowing downtank past the skimmer because there is only glass-to-glass contact at this location. The metal of the skimmer is suitable for use in the firing zone, and good results have been achieved with the apex of the V opposite of the last firing port of a five-port furnace.

Only one-half of the described skimmer, i.e., an angled member extending toward the center of the tank and terminating at one end in a skin kiln, may be used without difficulty of positioning and with satisfactory results in improvement of glass quality.

In any event, provision is made to withdraw continuously the surface flow of the material from the skim kilns. To accomplish this, the basin block of the tank is removed to a level slightly below the glass level, so that the surface flow, i.e., scum and foam and the like, drains from the kiln.

The pipe or pipes from which the skimmer parts are made can be formed of stainless steel, iron, platinum, coated refractory material, or any other material which can be used in the ambient atmosphere above the glass.

In another aspect, the invention relates to a method for the production of glasses containing one or more fugitive or volatile components or ingredients, and in particular, to a method for production of glasses of this kind that tend to vitrify at elevated temperatures of 2500 degrees Fahrenheit or more. In accordance with the invention, glasses of the kind indicated above are melted in a furnace that has been provided with a skimmer and a drain of the kind indicated above, so that siliceous scum is constantly removed and good yields of product flat glass of adequate quality are thus obtained.

DESCRIPTION OF THE DRAWING

A complete understanding of the invention may be obtained from the foregoing and following description thereof, taken together with the appended drawing, in which:

FIG. 1 is a schematic plan view of a glass-melting tank incorporating the instant invention;

FIG. 2 is a partial perspective view of a skimmer as used in FIG. 1, showing a suitable position for such skimmer with respect to a body of glass; and FIG. 3 is a view similar to FIG. 2, showing a modification of the skimmer, with parts broken away.

DESCRIPTION OF THE PREFERRED EMBODIMENTS

FIG. 1 illustrates schematically a glass-melting tank 10 including a backwall 12 having a feeding doghouse 14 therein, side walls 16 with firing ports 18 on opposite sides thereof, skim kilns 20 downtank of the firing ports, and a working section 22 downtank of the skim kilns 20. Suitable burners 19 are positioned in a conventional manner in the ports 18. Batch ingredients are fed into the feeding doghouse 14 and onto a body of glass in the tank and are melted therein; molten glass flows downtank from the melting end to the working end 22 to be processed into a product, such as sheet glass, plate glass, float glass, optical glass, fiber glass or containers.

The tank is constructed of refractory blocks which become eroded by glass contact, and certain ingredients float downtank to contaminate the product. According to this invention, a generally V-shaped skimmer 24 is positioned so that its ends pass through the skim kilns and terminate at locations just outside the skim kilns where they can be connected to suitable sources of cooling fluid (not shown) while the apex of the V preferably extends into the firing area of the tank. The type of skimmer 24 as shown in FIG. 2 is positioned with the passes vertically, preferably, such that the lower pass just touches the glass.

The skimmer of FIG. 2 is composed of at least one pipe which doubles back upon itself. In this case, cooling fluid is introduced into the upper portion or pass, to flow to the apex of the skimmer and then back through the lower portion or pass to discharge. The skimmer 24a, in another form may be constructed of concentric tubes, as indicated in FIG. 3, in which cooling fluid is introduced centrally to flow back to discharge through the outer jacket. In any event, the temperature of the cooling fluid, generally water, is less than the glass adjacent to the skimmer, so that a mass of glass freezes on a portion of the skimmer.

At times, effective skimming can be accomplished with just one leg of the V illustrated in FIG. 1.

The drains 30 for the skim kilns are illustrated in FIG. 1. The surface material which is continuously removed from the kiln flows from the skim kilns through an opening 32 in the wall thereof to discharge through a drain conduit 34. In the drawing, the usual flows of material are indicated by arrows.

SPECIFIC EXAMPLE

In the producing plate glass having a composition containing, as the major ingredients, by weight, about 20 percent $Al_2O_3$, 8 percent $Na_2O$, 5 percent $Li_2O$, 4 percent $B_2O_3$, balance substantially silica, it was found that the glass being rolled included a silica-rich surface layer which contained a lesser amount of boron than the body of the glass. This was discovered because the surface glass had a different index of refraction than the remainder of the glass in the plate. Chemical analysis indicated that the silica-rich layer contained at least about 1 percent more $SiO_2$ and about 1 percent less $B_2O_3$ than the remainder of the glass. It is known from the literature that the replacement of 1 percent $SiO_2$ by 1 percent $B_2O_3$ leads to an increase in the index of refraction of 0.0027.

To eliminate or reduce the variations in glass composition in the product, a skimmer constructed of a U-shaped stainless-steel pipe with an outer diameter of 2½ inches was fabricated. This was constructed in two sections, and the sections were installed through the walls of the opposite skim kilns, meeting at a 90-degree angle in a V, uptank or toward the feeding end of the tank. The return pass of the U was immersed approximately one inch into the glass, and cooling water from a tap was passed therethrough.

The skimmer diverted material flowing upon the surface of the melt in the tank to the skim kilns for removal. After the operation of the tank was stabilized and while the skimmer placed therein was used, samples of the product were taken and analyzed. They were substantially homogeneous in composition throughout. The material drained from the skim kiln was analyzed. It contained excessive silica and was depleted in boron.

It is considered that the water-cooled member or members used should form, with the side walls of the furnace through which they are inserted, when viewed in plan, an angle of about 40 to 85 degrees. When that angle is less than 40 degrees, there is a tendency for the water-cooled pipe to be undesirably long; more material is required for its construction, and it becomes more difficult to support adequately in the furnace and to cool adequately. When the angle is greater than 85 degrees, there is a tendency for the water-cooled pipe not to exert sufficient diverting action upon the foam or scum on the surface of the glass toward the skim kilns.

In its method aspects, the instant invention is concerned with the melting of glasses that contain a substantial proportion of a volatile or fugitive component or ingredient. A glass that contains more than about 2 percent of boron oxide, lead oxide, zinc oxide, selenium, fluorine, antimony oxide, sodium hydroxide, zinc oxide or lead oxide or the like may be expected in its melting to exhibit the phenomenon of developing on its surface a relatively silica-rich stratum or layer, as a result of the volatilization of such ingredient or ingredients. This effect is aggravated if the basic composition of the glass is such as to require a relatively high melting temperature, i.e., on the order of 2600 degrees Fahrenheit and above. Other things being equal, the process of bringing a melt of glass to such an elevated temperature requires additional time, so that the volatile or fugitive components of the melt have a greater opportunity to escape. There are many glasses that are used for special purposes that require high melting temperatures and thus are, in their melting, subject to difficulties of the kind that may be alleviated or overcome by means of the instant invention. Thus the invention may be considered as being of particular use for the melting of glasses that vitrify at about 2500 degrees Fahrenheit or higher.

We claim as our invention:

1. In apparatus for melting glass which includes a melting tank having side walls and at least one means adjacent a side wall for removing tank scum and foam downtank in the direction toward a working section, said side walls each having openings leading to the means adjacent thereto for removing scum and foam and in which tank, scum and foam form on the molten glass and tend to float downtank toward said working section, the improvement which comprises:

a cooled metal conduit extending at an angle to the side wall of the tank adjacent thereto and positioned so that the lowermost portion of said conduit is disposed at a location on or immediately below the surface of the molten glass, the remaining portion of said conduit being above the surface of said molten glass and exposed to the atomsphere thereabove, said conduit having one end adjacent the opening in the side wall leading to said means adjacent to said side wall for removing scum and foam and another end extending toward the feed end of the tank and at an angle to the path of flow of the molten glass in said tank; and means to supply a cooling fluid to said conduit, whereby by circulation of said cooling fluid the glass may be frozen at a surface portion thereof to direct at least a portion of said scum and foam into said means for removing scum.

2. The apparatus of claim 1 in which said tank scum and foam removing means comprises a side-positioned skim-positioned skim kiln.

3. Apparatus as recited in claim 2 further including drains communicating with each skim kiln for receiving any material directed thereto by said cooled metal conduit.

4. The apparatus of claim 1 having metal conduits each extending at an angle from the adjacent side wall to converge and form a V-shaped conduit in plan having an apex extending toward the feed end of said tank, each said conduit having an end adjacent an opening leading to the scum and foam removing means adjacent to said conduit.

5. The apparatus of claim 1 in which said cooled metal conduit is a stainless steel pipe.

6. A method for removing scum and foam from the surface of a mass of molten glass flowing from an upstream end of a zone past at least one laterally extending scum and foam collecting zone to a working section downstream from said last-named zone which comprises, placing a heat conducting body adjacent to the surface of said flowing glass, said body having a lowermost surface located on or immediately below the surface of flowing glass, and surfaces extending upwardly from said lowermost surface, said upwardly extending surfaces being positioned to face, respectively, the upstream end and the working section of said first-named zone, said surfaces being connected to provide a conduit extending from one end to the other of said heat conducting body, positioning said heat conducting body at an angle to the path of flow of said flowing glass with one end thereof adjacent the scum and foam-collecting zone and the other end extending toward the upstream end of the flowing glass, and flowing a cooling liquid through said conduit, said cooling liquid being introduced into said conduit at a temperature and a rate of flow sufficient to chill the flowing glass in contact with said heat conducting body and form a layer of solid glass on the surfaces thereof to form a scum and foam barrier and to direct said scum and foam into said laterally extending collecting zone.

7. In the production of flat glass having a composition containing at least 2 weight percent of volatile component selected from the group consisting of boron trioxide, selenium, fluorine, zinc oxide, lead oxide, antimony oxide, and sodium hydroxide wherein a mass of molten glass flows from an upstream end of a zone past at least one laterally extending scum and foam collecting zone to a working section downstream from said last-named zone, the improvement which comprises a method for removing scum and foam from the surface of said mass of glass which comprises placing a heat conducting body adjacent to the surface of said flowing glass, said body having a lowermost surface located on or immediately below the surface of flowing glass, and surfaces extending upwardly from said lowermost surface, said upwardly extending surface being positioned to face, respectively, the upstream end and the working section of said first-named zone, said surfaces being connected to provide a conduit extending from one end to the other of said heat conducting body, positioning said heat-conducting body at an angle to the path of flow of said flowing glass with one end thereof adjacent the scum- and foam-collecting zone and the other end extending toward the upstream end of the flowing glass, and flowing a cooling liquid through said conduit, said cooling liquid being introduced into said conduit at a temperature and a rate of flow sufficient to chill the flowing glass in contact with said heat-conducting body and form a layer of solid glass on the surfaces thereof to form a scum and foam barrier and to direct said scum and foam into said laterally extending collecting zone.

8. A method as defined in claim 7, characterized in that said glass composition is a high melting glass composition that vitrifies at 2500 degrees Fahrenheit or above.

References Cited

UNITED STATES PATENTS

| | | | |
|---|---|---|---|
| 1,538,215 | 5/1925 | Reece | 65—125 |
| 1,835,690 | 12/1931 | Bowman | 65—356 X |

ARTHUR D. KELLOGG, Primary Examiner

U.S. Cl. X.R.

65—338, 342, 356